United States Patent
Jeon et al.

(10) Patent No.: US 7,933,190 B2
(45) Date of Patent: Apr. 26, 2011

(54) ELECTRIC FIELD READ/WRITE DEVICE AND METHOD OF DRIVING THE SAME

(75) Inventors: Dae-young Jeon, Mokpo-si (KR);
Hyoung-soo Ko, Seoul (KR);
Seung-bum Hong, Seongnam-si (KR);
Chul-min Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 788 days.

(21) Appl. No.: 11/930,223

(22) Filed: Oct. 31, 2007

(65) Prior Publication Data
US 2008/0279062 A1 Nov. 13, 2008

(30) Foreign Application Priority Data
May 11, 2007 (KR) .................. 10-2007-0046201

(51) Int. Cl.
*G11B 7/00* (2006.01)
(52) U.S. Cl. .................. 369/126; 369/100; 369/13.13; 369/47.1
(58) Field of Classification Search ............ None
See application file for complete search history.

(56) References Cited

U.S. PATENT DOCUMENTS
6,477,132 B1 * 11/2002 Azuma et al. ............... 369/126

FOREIGN PATENT DOCUMENTS
JP 2005-012068 A 1/2005
JP 2007-066356 A 3/2007

* cited by examiner

*Primary Examiner* — Muhammad N Edun
(74) *Attorney, Agent, or Firm* — Sughrue Mion, PLLC

(57) ABSTRACT

Provided are an electric field read/write device and a method of driving an electric field read/write device. The method including an electric field read/write head comprising a resistance region disposed between a source region and a drain region and a writing electrode disposed on the resistance region, wherein the method includes: applying a controlling voltage to the writing electrode, wherein the controlling voltage is smaller than a threshold voltage which causes polarization of a recording medium, and reproducing data recorded in the recording medium according to change of an amount of a current flowing through the resistance region according to a polarization direction of electric domains of the recording medium.

7 Claims, 8 Drawing Sheets

ELECTRIC FIELD READ/WRITE DEVICE AND METHOD OF DRIVING THE SAME

CROSS-REFERENCE TO RELATED PATENT APPLICATION

This application claims priority from Korean Patent Application No. 10-2007-0046201, filed on May 11, 2007, in the Korean Intellectual Property Office, the disclosure of which is incorporated herein in its entirety by reference.

BACKGROUND OF THE INVENTION

1. Field of the Invention

Apparatuses and methods consistent with the present invention relate to an electric field read/write device and a method of driving the electric field read/write device, and more particularly, to an electric field read/write device including an electric field read/write head that can read/write data in a ferroelectric medium and a method of driving the electric field read/write device.

2. Description of the Related Art

A hard disk drive (HDD) is a storage device that operates by spinning a data recording medium and suspending a read/write head over it in order to read and write data. A conventional HDD typically uses a magnetic field to create a plurality of magnetic domains magnetized in a first direction or in a second direction, opposite to the first direction, on the magnetic recording medium. Magnetic domains magnetized in the first and second directions correspond to data '0' and data '1', respectively.

HDDs employing this magnetic writing method have undergone tremendous increases in their writing densities over the last few decades. Horizontal magnetic writing on HDDs can produce approximately 100 Gb/in$^2$ in recording density, and vertical magnetic writing on HDDs can produce approximately 500 Gb/in$^2$ in recording density. However, since it is difficult for a magnetic read/write head to form a strong localized magnetic field, the increase of recording density is limited.

Recently, research has been conducted into ferroelectric medium (on which data is written using electric fields) and corresponding read/write heads (electric field read/write heads). The electric field writing method uses an electric field to form electric domains polarized in a first direction or in a second direction opposite to the first direction on a ferroelectric surface. Electric domains polarized in the first and second directions correspond to data '0' and data '1', respectively. The resistance of the electric field read/write head above that domain changes according to the polarization direction of an electric domain, so that an amount of a current flowing between a source electrode and a drain electrode of the electric field read/write head may change. By detecting the change of the current amount, the data written in the electric domain can be discerned. According to electric field reading/wiring, high recording density of 1 Tb/in$^2$ or more can be achieved.

SUMMARY OF THE INVENTION

The present invention provides an electric field read/write device and a driving method thereof to enhance read sensitivity of an electric field read/write head.

According to an aspect of the present invention, there is provided a method of driving an electric field read/write device including an electric field read/write head including a resistance region disposed between a source region and a drain region, and a writing electrode disposed on the resistance region, including: applying a controlling voltage to the writing electrode, wherein the controlling voltage is smaller than a threshold voltage which causes polarization of a recording medium; and reproducing data recorded in the recording medium according to change of an amount of a current flowing through the resistance region according to a polarization direction of electric domains of the recording medium.

The controlling voltage may be in the range of 0 to ±4 V.

The method may further include: polarizing a plurality of testing electric domains in first or second directions on the recording medium; applying a testing voltage to the writing electrode; detecting a first drain current due to the testing electric domain having the first polarization direction; detecting a second drain current due to the electric domain having the second polarization direction; calculating a difference between the first drain current and the second drain current; determining the testing voltage in which the difference between the first drain current and the second drain current is a predetermined reference value or more while the testing voltage applied to the writing electrode is changed; and setting the determined testing voltage as the controlling voltage.

The method may further include: applying a voltage equal to or greater than the threshold voltage to the writing electrode to cause polarization of the recording medium and to record data in the recording medium.

According to another aspect of the present invention, there is provided an electric field read/write device including: a ferroelectric writing medium; an electric field read/write head comprising a resistance region disposed between a source region and a drain region, and a writing electrode disposed on the resistance region; and a head driving unit applying a controlling voltage to the writing electrode during reproducing data, wherein the controlling voltage is smaller than a threshold voltage which causes polarization of the recording medium.

The head driving unit may apply a controlling voltage in the range of 0 to ±4 V.

The head driving unit may apply a voltage equal to or greater than the threshold voltage to the writing electrode during recording data.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
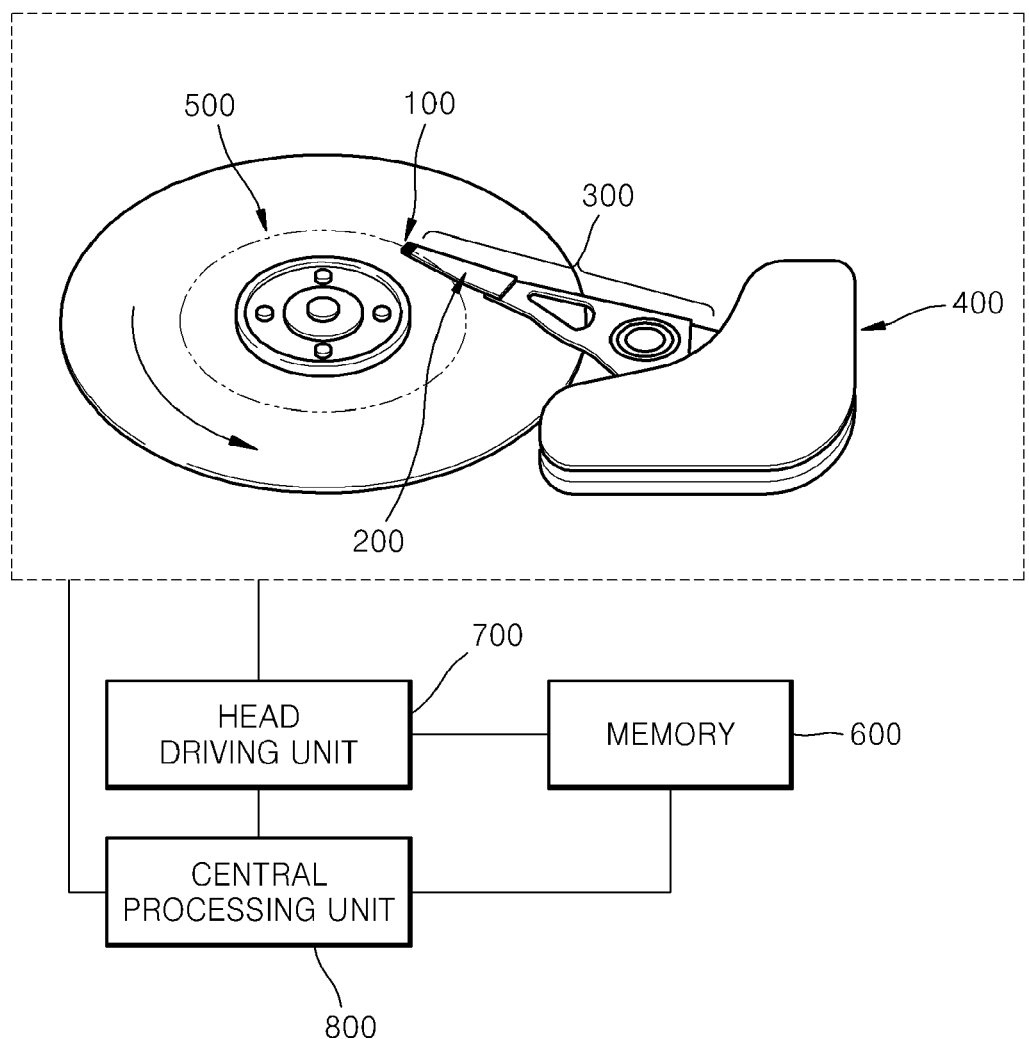
FIG. 1 is a perspective view of an electric field read/write device according to an exemplary embodiment of the present invention.

Hereinafter, a method of increasing read sensitivity of an electric field read/write head, an electric field read/write device having increased read sensitivity and a method of reading/writing of the electric field read/write device according to the present invention will be described in detail by explaining exemplary embodiments of the invention with reference to the attached drawings. In the drawings, the thickness of layers and region are exaggerated for clarity. The same reference numerals in the drawings denote the same element.

Figure 2:
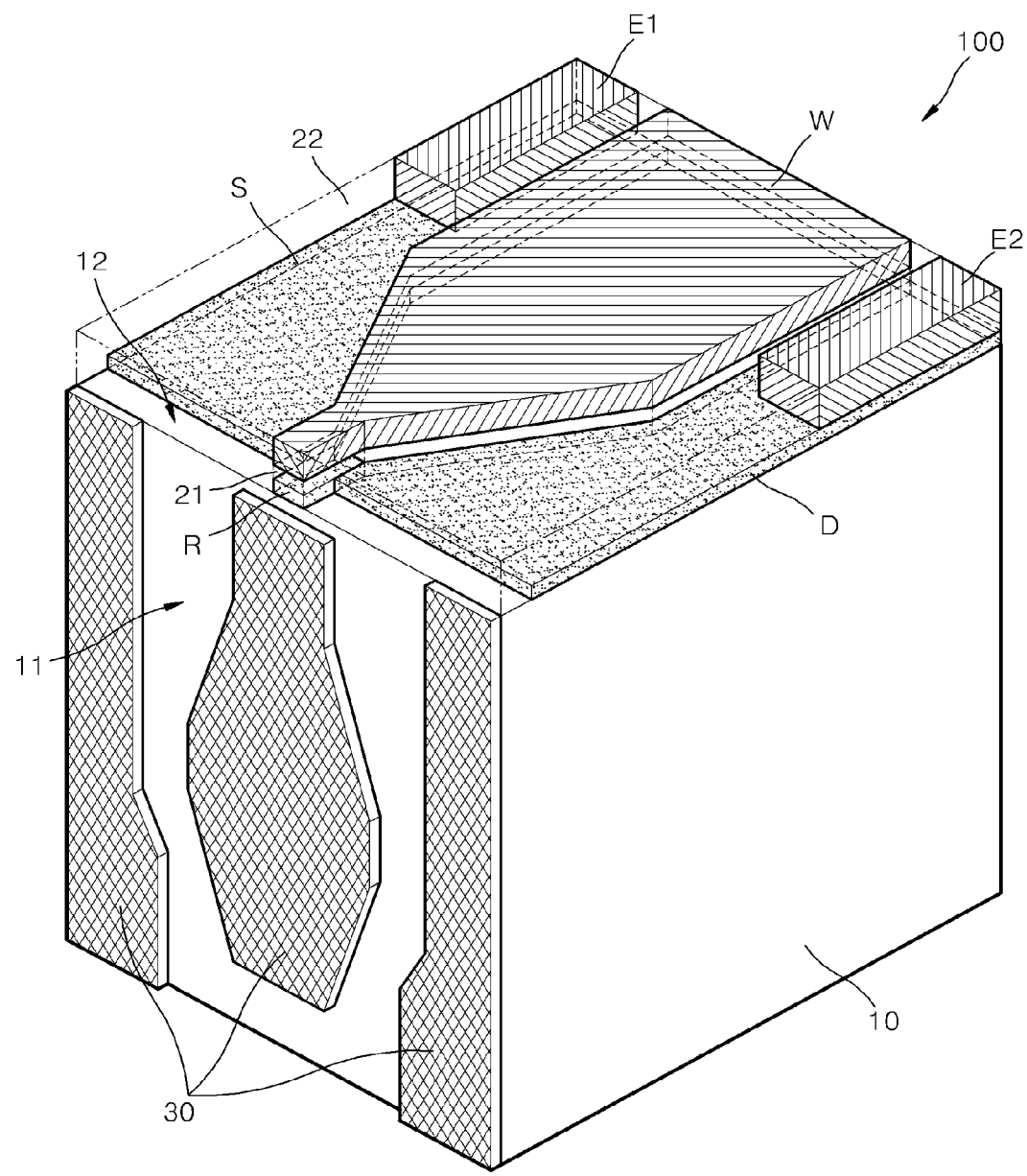
FIG. 2 is a perspective view of an electric field read/write head illustrated in FIG. 1 according to an exemplary embodiment of the present invention.
Figure 3:
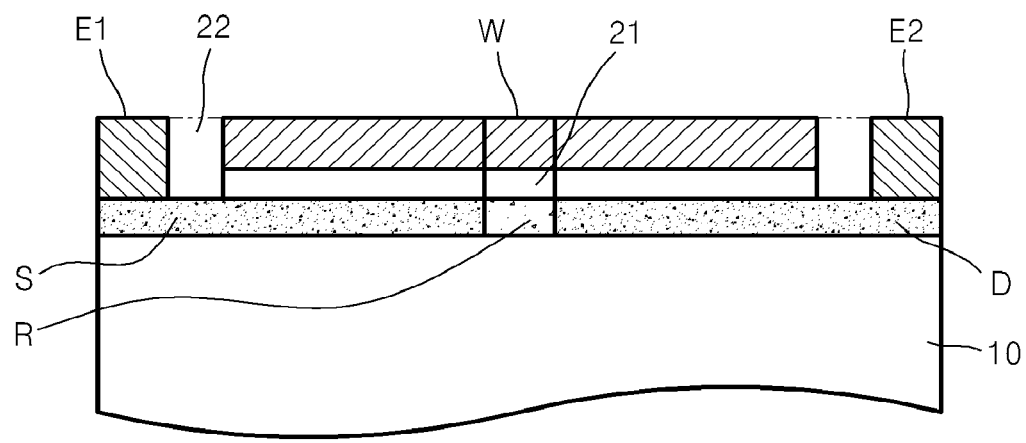
FIG. 3 is a front view of an electric field read/write head illustrated in FIG. 1 according to the exemplary embodiment of the present invention.

FIG. 1 is a perspective view of an electric field read/write device according to an exemplary embodiment of the present invention. FIGS. 2 and 3 are respectively a perspective view and a front view of an electric field read/write head 100 illustrated in FIG. 1 according to an exemplary embodiment of the present invention.

In FIG. 1, a rotatable disk-type recording medium 500 is illustrated. The recording medium 500 is a ferroelectric medium. Although not illustrated, the recording medium 500 is formed in a structure in which a lower electrode and a ferroelectric layer are sequentially formed on a substrate. The substrate may be formed of Si, glass or the like. The lower electrode may be formed of an electrode material that is used in a semiconductor device, and may be formed of metal such as Pt, Al, Au, Ag, Cu or the like or metal oxide such as $SrRuO_3$, $(La,Sr)CoO$ or the like. The lower electrode is grounded. The ferroelectric layer may be formed of a ferroelectric material such as $PZT(PbZr_xTi_{1-x}O_3)$, $PbTiO_3$, $PbZrO_3$, $SrBi_2Ta_2O_9(SBT)$, $KNbO_3$, $LiTaO_3$, $LiNbO_3$ or the like. A passivation layer may be further formed on the ferroelectric layer. The passivation layer may be formed of diamond like carbon (DLC) together with lubricant used in a surface of a general hard disk, and may be formed of any one of the DLC and the lubricant.

The electric field read/write head 100 of FIG. 2 is attached onto a suspension 200 that is disposed at a tip of a swing arm 300. The swing arm 300 is rotated by a voice coil motor 400. Thus, the electric field read/write head 100 floats to a surface of the recording medium 500 according to an air bearing effect. A driving system of the electric field read/write device of FIG. 1 is the same as a conventional driving system of HDD. However, the electric field read/write device employs the ferroelectric medium instead of a magnetic recording medium of a conventional HDD, and employs the electric field read/write head 100 instead of a magnetic read/write head.

Referring to FIGS. 2 and 3, a semiconductor substrate 10 includes a first surface 11 facing the recording medium 500 and a second surface 12 joining the first surface 11. The semiconductor substrate 10 is formed of p-type or n-type semiconductor material. The first surface 11 and the second surface 12 may be perpendicular to each other.

A resistance region R, a source region S and a drain region D are disposed on the semiconductor substrate 10, wherein the resistance region R is a light doped impurity region, and the source region S and the drain region D are highly doped impurity regions respectively disposed on opposite sides of the resistance region R. A source electrode E1 and a drain electrode E2 are electrically connected to the source region S and the drain region D, respectively. In the case where the semiconductor substrate 10 is a p-type semiconductor, the resistance region R is an $n^-$-type impurity region, and the source and drain regions S and D are $n^+$-type impurity regions. In the case where the substrate 10 is an n-type semiconductor, the resistance region R is a $p^-$-type impurity region, and the source and drain regions S and D are $p^+$-type impurity region. An insulating layer 21 is disposed on the resistance region R. A gate electrode W is disposed on the insulating layer 21. The gate electrode W is a writing electrode. Hereinafter, the gate electrode will be referred to as a writing electrode W. An insulating layer 22 is disposed on the exposed source region S and drain region D.

An air bearing surface (ABS) pattern 30 may be formed on the first surface 11 of the semiconductor substrate 10. The ABS pattern 30 functions so that the electric field read/write head 100 including the ABS pattern 30 may float to a surface of the recording medium 500.

According to the above structure, the resistance region R is a channel through which a current can flow between the source region S and the drain region D. A resistance of the resistance region R changes according to a voltage applied to the resistance region R. Accordingly, an amount of a current flowing through the source electrode E1 and the drain electrode E2 changes according to a drain voltage applied between the source electrode E1 and the drain electrode. Hereinafter, the reading and writing principles will be briefly described.

During recording data, a head driving unit 700 applies a positive (+) voltage or a negative (−) voltage of which absolute values are larger than a threshold voltage to the writing electrode W of the electric field read/write head 100. When the positive (+) voltage is applied to the writing electrode W, an electric domain of the recording medium 500, which faces the writing electrode W, is polarized in a first polarization direction, and the surface of the corresponding electric domain has negative (−) charges. On the other hand, when the negative (−) voltage is applied to the writing electrode W, an electric domain of the recording medium 500, which faces the writing electrode W, is polarized in a second polarization direction, and the surface of the corresponding electric domain has positive (+) charges. Thus, according to the voltage applied to the writing electrode W, a polarization direction of an electric domain of the recording medium 500 changes, and data can be recorded in the recording medium 500.

In the case where the source and drain regions S and D of the electric field read/write head 100 are $n^+$ regions, and the resistance region R is an $n^-$ region, if an electric domain of the recording medium 500, which faces the resistance region R, is polarized in a first polarization direction, and thereby the surface of the corresponding electric domain has negative (−) charges, the electron density of the resistance region R is reduced, and the resistance of the resistance region R is increased. An amount of a current flowing from the source region S to the drain region D through the resistance region R is reduced. On the other hand, in the case where an electric domain of the recording medium 500, which faces the resistance region R, is polarized in a second polarization direction, and a surface of the corresponding electric domain has positive (+) charges, the electron density of the resistance region is increased, and thereby the resistance of the resistance region R is reduced. Then, an amount of a current flowing from the source region S to the drain region D through the resistance region R is increased. According to the change of the resistance and the current amount, data recorded in a surface of the recording medium 500 can be read.

Figure 4:
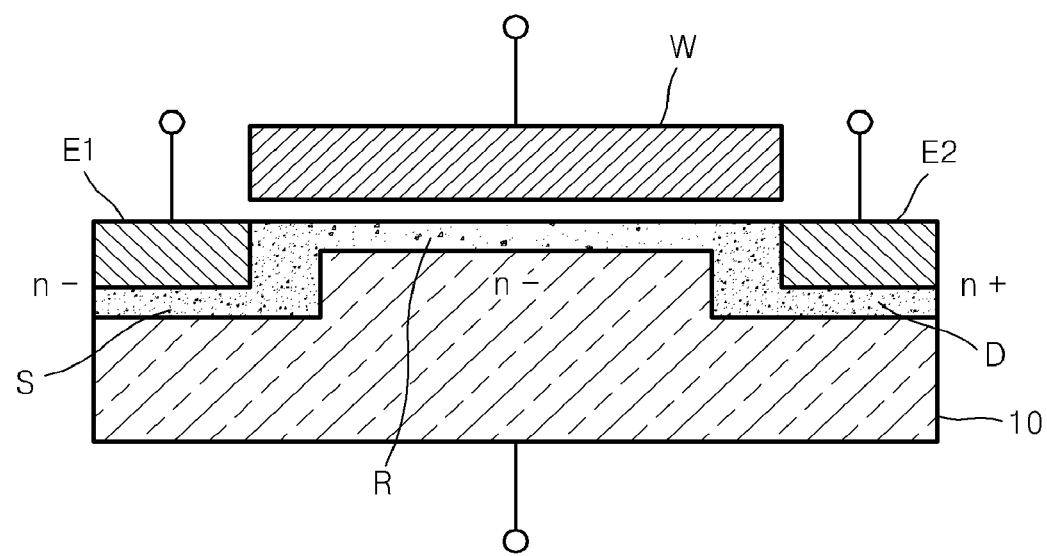
FIG. 4 is a diagram of the electric field read/write head of FIG. 2.

FIG. 4 is a diagram of the electric field read/write head 100 of FIG. 2. In FIG. 4, the semiconductor substrate 10 is formed of a p-type semiconductor material, and the resistance region R constitutes an n⁻ channel between the source region S and the drain region D. The resistance of the resistance region R changes according to a gate voltage Vg applied to the writing electrode W. When a drain voltage is applied to the source region S and the drain region D, a drain current Id, which is inversely proportional to the resistance of the resistance region R, flows between the source region S and the drain region D.

Figure 5:
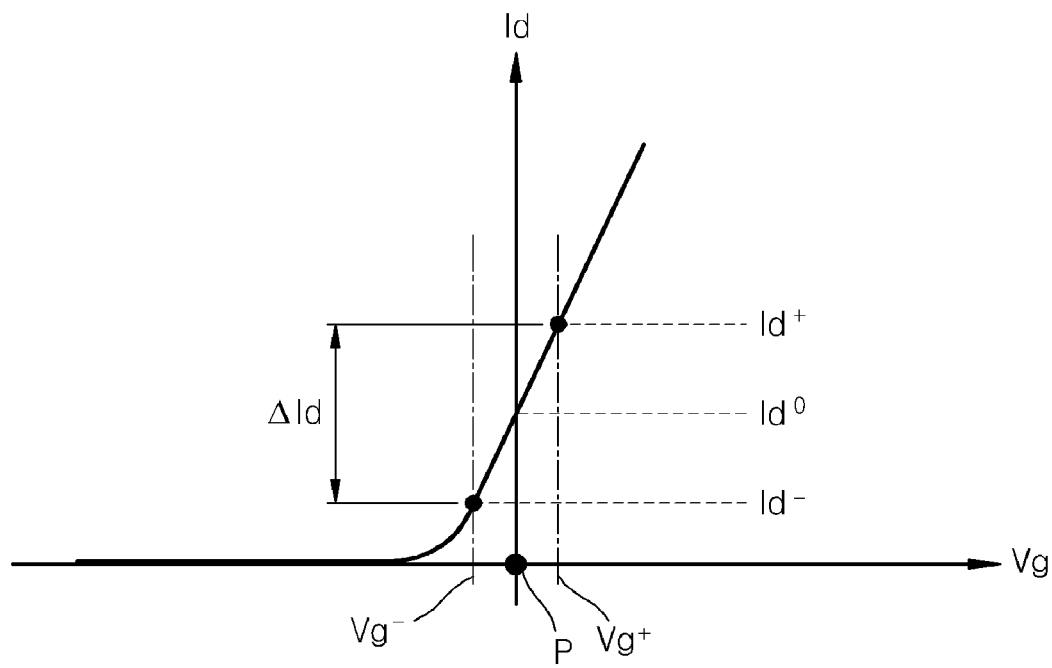
FIG. 5 is a graph of a gate voltage Vg versus a drain current Id.

FIG. 5 is a graph of a gate voltage Vg versus a drain current Id. In this case, the gate voltage Vg is a voltage applied to the resistance region R. When a voltage is not applied to the writing electrode W, the gate voltage Vg is a voltage applied to the resistance region R due to an electric field generated by a polarization voltage of the recording medium 500. To read data from the recording medium 500, the sensitivity of the electric field read/write head 100 is important. Since an electric domain of the recording medium 500 is polarized in a second polarization direction, when a surface of the recording medium 500 has positive (+) charges, the gate voltage Vg is $Vg^+$. At this time, a current flowing between the source region S and the drain region D is referred to as $Id^+$. Since an electronic domain of the recording medium 500 is polarized in a first polarization direction, a surface of the recording medium 500 has negative (−) charges, the gate voltage Vg is $Vg^-$. At this time, a current flowing between the source region S and the drain region D is referred to as $Id^-$. A difference between $Id^+$ and $Id^-$ is referred to as ΔId. When the recording medium 500 has no polarity, that is, when no data is recorded in the recoding medium 500 since the recording medium 500 is not polarized in any direction, a current flowing between the source region S and the drain region D is referred to as $Id^0$. Sensitivity (%) can be expressed by $[\Delta Id/Id_0] \times 100(\%)$. An operational point P denotes the case where any data is not recorded in the recording medium 500. Referring to FIG. 5, the greater ΔId, the higher the sensitivity.

The manufacturing process of the electric field read/write head 100 is briefly described as follows. The insulating layer 21 and the writing electrode W are formed on the second surface 12 of the semiconductor substrate 10. Next, a surface of the semiconductor substrate 10, that is, the second surface 12 is highly doped with an impurity using the insulating layer 21 and the writing electrode W as an ion implantation mask. At this time, the impurity is an n-type impurity when the semiconductor substrate 10 is for a p-type semiconductor. When a substrate 10 is an n-type impurity, the impurity is a p-type impurity. Next, annealing is performed in order to diffuse the doped impurity. Thereby, the source region S and the drain region D, which are highly doped impurity regions, are respectively formed on both sides of the insulating layer 21 and the writing electrode W of the semiconductor substrate 10. The resistance region R, which is a lightly doped impurity region, is formed below the insulating layer 21 and the writing electrode W of the semiconductor substrate 10.

For example, in the case where the semiconductor substrate 10 is a p-type semiconductor substrate, the n-type impurity doped in the above process is sufficiently diffused into the resistance region R by annealing, a good n⁻ channel is formed in the resistance region R, and thus the electric field read/write head 100 having sufficient sensitivity can be manufactured, as shown in the graph of FIG. 5. However, it is not easy that impurity having a desired concentration is diffused into the resistance region R. When the resistance region R is imperfectly formed as the n⁻ channel, the relationship between the gate voltage Vg and the drain current Id can be the same as that illustrated in FIG. 6. That is, since ΔId is too small with respect to the operational point P, the sensitivity is very small. In this case, data recorded in the recording medium 500 can not be read.

Figure 6:
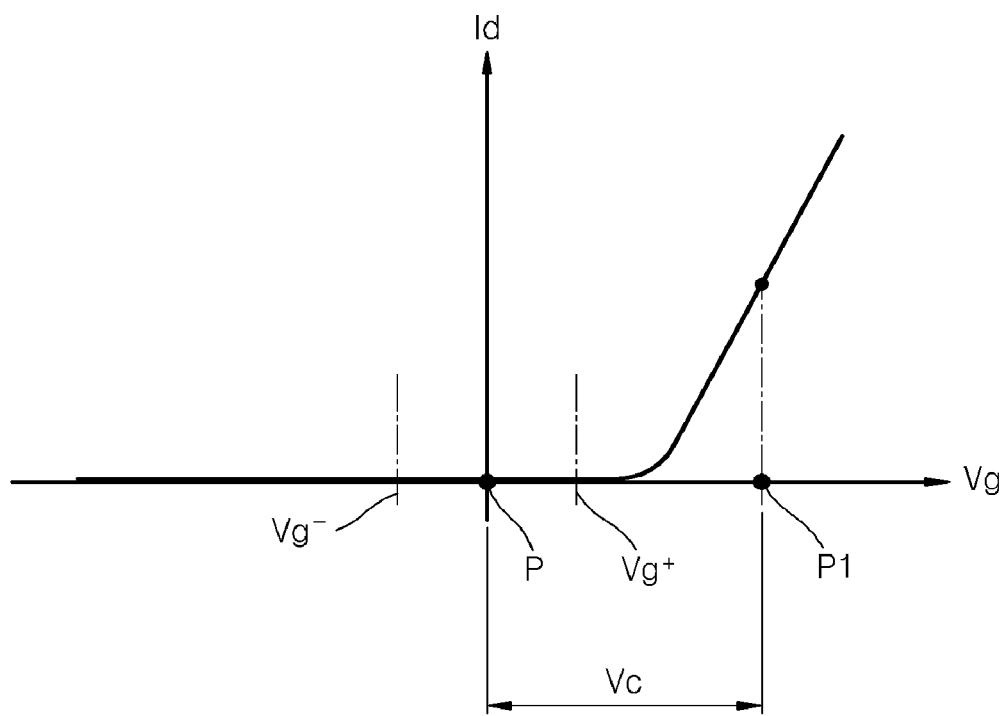
FIG. 6 is a graph of a gate voltage Vg and a drain Id when a resistance region is defectively formed as a channel.

In FIG. 6, if the operational point P can be moved to an operational point P1, the sensitivity can be improved. To achieve this, the present invention is configured in that a controlling voltage Vc is applied to the writing electrode W during reproducing operation. Then, the controlling voltage Vc acts as the gate voltage Vg, and thus the operational point P of the electric field read/write head 100 is moved to the operational point P1, thereby improving the sensitivity.

Figure 7:
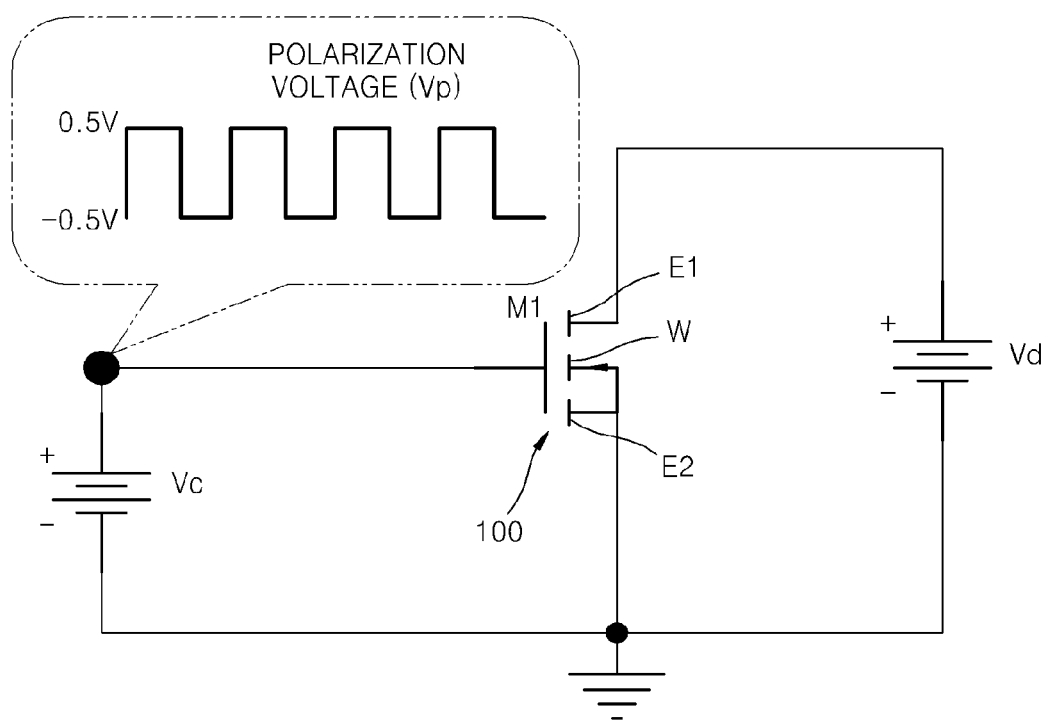
FIG. 7 is a circuit diagram for testing an effect of sensitivity increased in the case where a controlling voltage is applied to the writing electrode.
Figure 8:
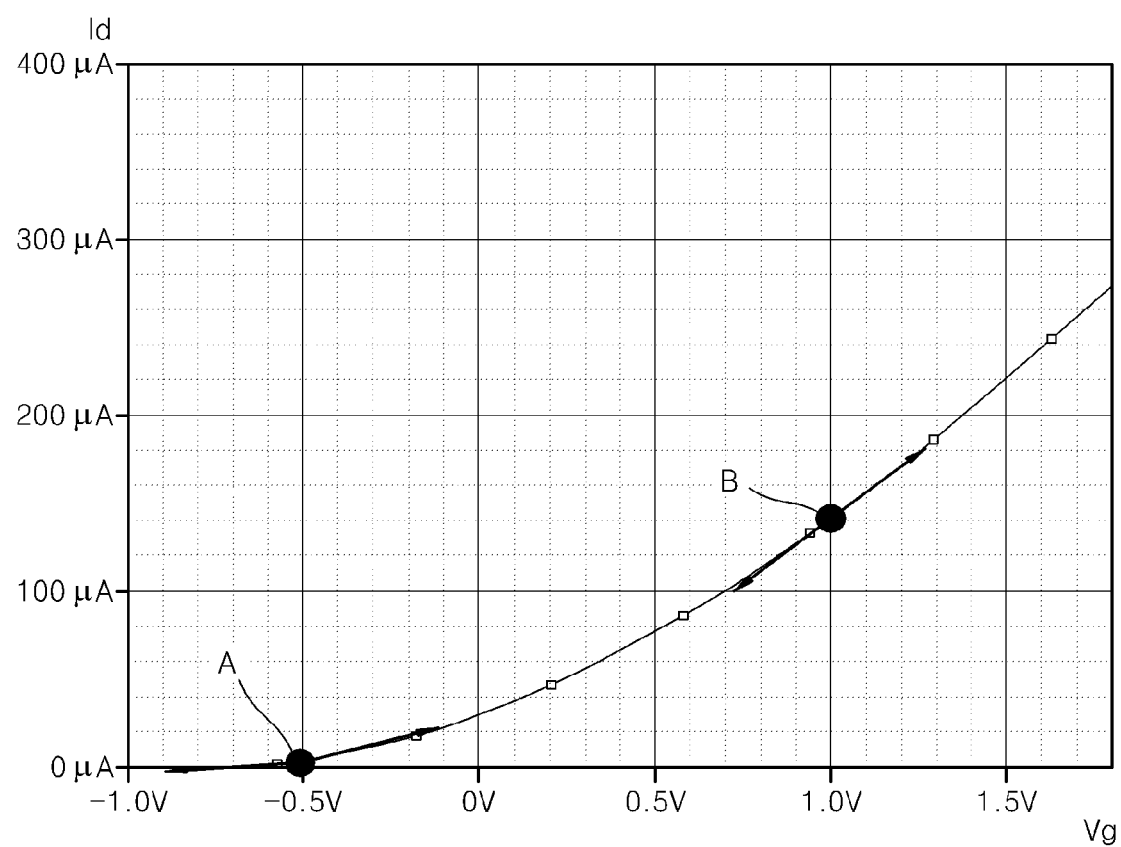
FIG. 8 is a graph illustrating the variation of the drain current according to the gate voltage.
Figure 9A:
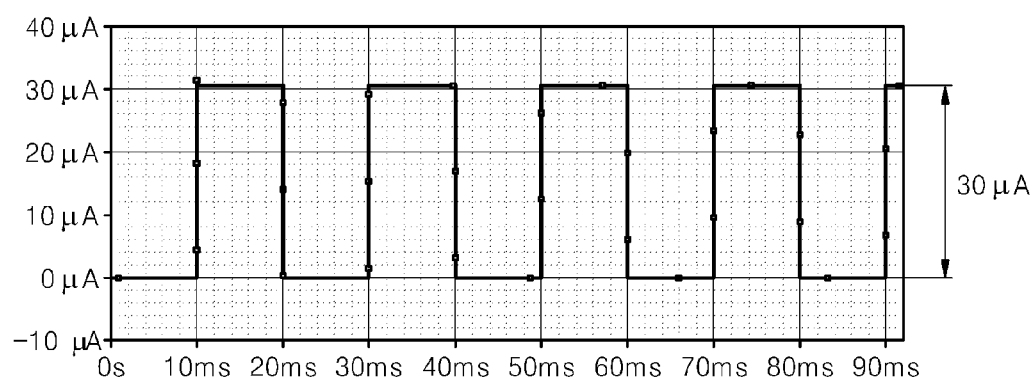
FIGS. 9A and 9b are respectively graphs of changes of a drain current in controlling voltages are −0.5 and +1.0V.
Figure 9B:
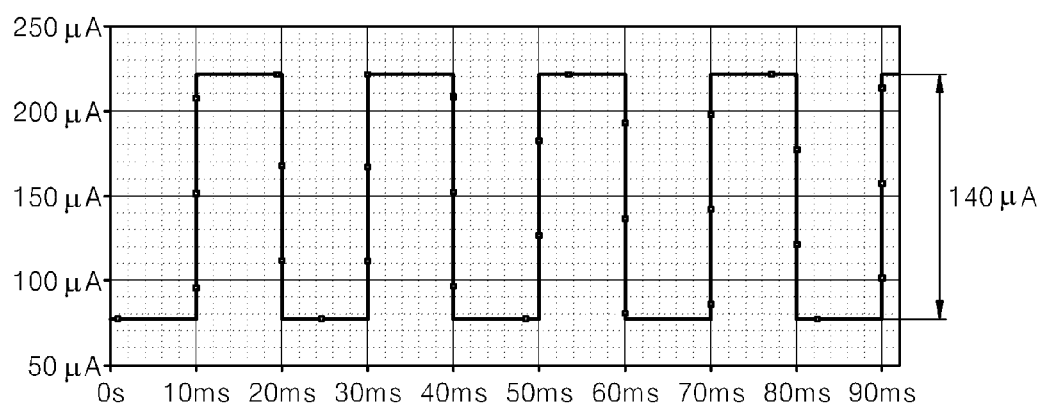

FIG. 7 is a circuit diagram for testing an effect of sensitivity increased in the case where the controlling voltage Vc is applied to the writing electrode W. Referring to FIG. 7, the electric field read/write head 100 can be designed as an electric field effect transistor. The electric field read/write head 100 is a depletion-type head in which the resistance region R is an n⁻ channel. The drain voltage is applied to the source electrode E1 and the drain electrode E2, and the controlling voltage Vc is applied to the writing electrode W. In this state, a pulse-type voltage is applied to the writing electrode W, wherein the pulse-type voltage is a polarization voltage Vp of the recording medium 500 and varies between −0.5 V and +0.5 V. Then, the gate voltage Vg becomes a voltage in which the controlling voltage Vc and the polarization voltage Vp are added. FIG. 8 is a graph illustrating the variation of the drain current Id according to the gate voltage Vg. In FIG. 8, an operational point A denotes the case where −0.5 V is applied as the controlling voltage, and an operational point B denotes the case where +1.0 V is applied as the controlling voltage Vc. In these cases, ΔIds are respectively about 30 μA and 140 μA, as illustrated in FIGS. 9A and 9B. Thus, it can be seen that the sensitivity can be improved by applying the controlling voltage Vc.

However, the writing electrode W causes the polarization of the recording medium 500 in order to record data in the recording medium, and is electrically grounded or floated during reproduction of data. Accordingly, when the controlling voltage Vc is applied to the writing electrode W during an reproducing operation, the polarization is caused in the recording medium 500, and thus undesired recording operation can be performed. To prevent this, the controlling voltage Vc may be less than a threshold voltage causing the polarization of the recording medium 500.

Figure 10:
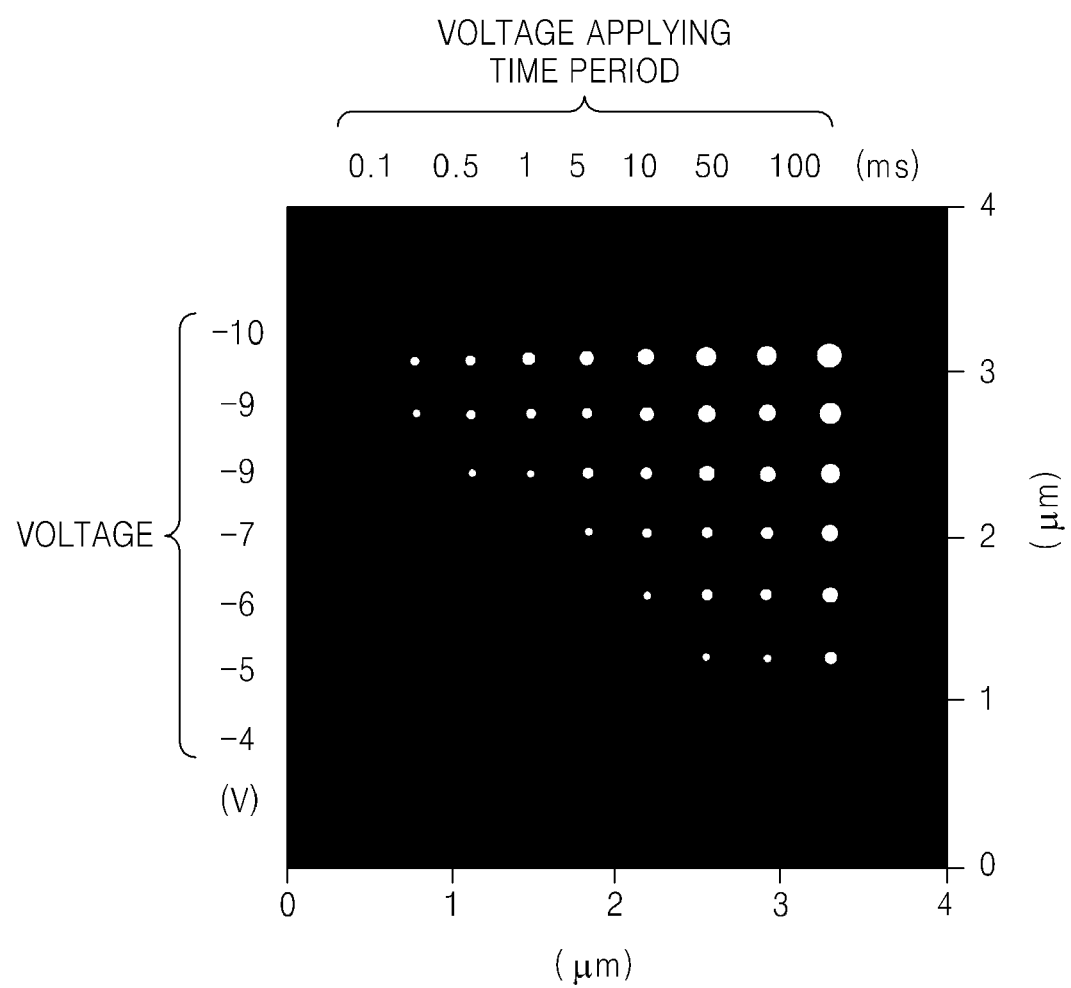
FIG. 10 is a piezoelectric force microscopy (PFM) image illustrating a figure in which a ferroelectric material is polarized when a voltage is applied to the ferroelectric material.

FIG. 10 is a piezoelectric force microscopy (PFM) image illustrating a figure in which a ferroelectric material is polarized when a voltage is applied to the ferroelectric material. In FIG. 10, a light area is a polarized area. Referring to FIG. 10, it can be seen that the threshold voltage of a general ferroelectric material is about ±5 V and the polarization is not caused in a voltage in the range of 0 to ±4 V. Accordingly, the controlling voltage Vc may be in the range of 0 to ±4 V.

As described above, the reproducing sensitivity of the electric field read/write head 100 can be improved by applying the controlling voltage Vc less than the threshold voltage to the writing electrode W during reproducing data. The controlling voltage Vc may be different according to the manufacturing conditions of the electric field read/write head 100. Accordingly, after finishing manufacturing the electric field read/write head 100, the controlling voltage Vc may be stored in a memory 600 of the electric field read/write device such that the desired reproducing sensitivity may be achieved. During the reproducing operation, the head driving unit 700 reads the controlling voltage Vc stored in the memory 600 to apply the controlling voltage Vc to the writing electrode W.

Further, the electric field read/write device itself can find the most appropriate controlling voltage Vc. For example, a voltage greater than the threshold voltage can be applied to the writing electrode W to form a plurality of testing electric domains polarized in first and second directions. Next, when a voltage is not applied to the writing electrode W, data recorded in the testing electric domains are read. A central processing unit 800 detects the difference $\Delta$Id between the drain current $Id^+$ due to the testing electric domain having a first polarization direction and the drain current $Id^-$ due to the testing electric domain having a second polarization direction, the difference $\Delta$Id is compared with a predetermined reference value. When the difference $\Delta$Id is smaller than the predetermined reference value, the central processing unit 800 applies a testing voltage smaller than the threshold voltage to the writing electrode W and obtains the difference $\Delta$Id to compare the difference $\Delta$Id with the reference value. While the testing voltage applied to the writing electrode W is changed, the above operations repeated. The central processing unit 800 stores a testing voltage, in which the difference $\Delta$Id is equal to or greater than the predetermined reference value, in the memory 600 as a controlling voltage value. The head driving unit 700 reads the controlling voltage value set in the memory 600 and applies the controlling voltage Vc to the writing electrode W, during reproducing operation.

According to the exemplary embodiments of the present invention, in an electric field read/write device and a method of driving the electric field read/write device, a predetermined voltage is applied to a writing electrode of the electric field read/write head during reproducing operation, and thus deteriorating of the read sensitivity due to manufacturing problems can be compensated and optimized read sensitivity can be obtained.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of driving an electric field read/write device comprising an electric field read/write head including a source region, a drain region, a resistance region disposed between the source region and the drain region, and a writing electrode disposed on the resistance region, the method comprising:
    applying a controlling voltage to the writing electrode, wherein the controlling voltage is smaller than a threshold voltage which causes polarization of a recording medium; and
    reproducing data recorded in the recording medium according to a change of an amount of a current flowing through the resistance region and a polarization direction of electric domains of the recording medium.

2. The method of claim 1, wherein the controlling voltage is in the range of −4 volts to +4 volts.

3. The method of claim 1, further comprising:
    applying a voltage equal to or greater than the threshold voltage to the writing electrode to cause polarization of the recording medium and to record data in the recording medium.

4. A method of driving an electric field read/write device comprising an electric field read/write head including a source region, a drain region, a resistance region disposed between the source region and the drain region, and a writing electrode disposed on the resistance region, the method comprising:
    applying a controlling voltage to the writing electrode, wherein the controlling voltage is smaller than a threshold voltage which causes polarization of a recording medium;
    reproducing data recorded in the recording medium according to a change of an amount of a current flowing through the resistance region and a polarization direction of electric domains of the recording medium;
    polarizing a plurality of testing electric domains in a first polarization direction or a polarization second direction on the recording medium;
    applying a testing voltage to the writing electrode;
    detecting a first drain current due to one of the testing electric domains having the first polarization direction;
    detecting a second drain current due to one of the testing electric domains having the second polarization direction;
    calculating a difference between the first drain current and the second drain current;
    determining a level of the testing voltage at which the difference between the first drain current and the second drain current is equal to or greater than a predetermined reference value while the testing voltage applied to the writing electrode is changed; and
    setting the controlling voltage to the determined level of the testing voltage.

5. An electric field read/write device comprising:
    a ferroelectric writing medium;
    an electric field read/write head comprising a source region, a drain region, a resistance region disposed between the source region and the drain region, and a writing electrode disposed on the resistance region; and
    a head driving unit which applies a controlling voltage to the writing electrode during reproducing data, wherein the controlling voltage is smaller than a threshold voltage which causes polarization of the recording medium.

6. The device of claim 5, wherein the head driving unit applies a controlling voltage in a range of −4 volts to +4 volts.

7. The device of claim 5, wherein the head driving unit applies a voltage equal to or greater than the threshold voltage to the writing electrode during recording data.

* * * * *